Dec. 26, 1950 S. KONGELBECK 2,535,142
LIQUID LEVEL CONTACTOR
Filed Oct. 7, 1947

INVENTOR.
Sverre Kongelbeck,
BY
Robyn Wilcox
Atty.

Patented Dec. 26, 1950

2,535,142

UNITED STATES PATENT OFFICE 2,535,142

LIQUID LEVEL CONTACTOR

Sverre Kongelbeck, Chicago, Ill., assignor to Infilco Incorporated, Chicago, Ill., a corporation of Delaware Application October 7, 1947, Serial No. 778,344

12 Claims. (Cl. 200—152)

This invention relates to a contact member for a liquid level gauge of the type described in the copending application of S. L. Adelson, Serial No. 705,577, now Patent No. 2,496,366, granted Feb. 7, 1950.

The Adelson application, above mentioned, relates to an apparatus for measuring the level of a liquid utilizing a single contact which directly or indirectly contacts the liquid surface, and which is automatically raised or lowered so as to follow the liquid surface. The apparatus in its preferred form comprises a pair of unidirectional motors in opposed relationship, operatively connected to a differential gear arrangement whereby a gear cage will rotate in one direction or the other depending upon which motor is running at a greater speed than the other, but which will remain motionless when both motors rotate at the same speed. This apparatus utilizes a "Flashtron," which is an electronic device providing two immediately responding, inertialess relays. An element of the Flashtron is an actuator circuit which when closed externally (even through a resistance as large as 20,000 ohms) will render only one of the relays conductive; while if the actuator circuit is broken, only the other of the relays will be rendered conductive. Thus one or the other of the relays is always conductive depending upon whether the actuator circuit is open or closed. The relays control delivery of power to the electric motors, so that one or the other of the motors will have power applied to it. The actuator circuit in the Adelson device includes the liquid whose level is to be measured and a contact member carried on a contact rod which is raised and lowered by movement of the gear cage. Thus when the contact engages the liquid surface one of the motors will be actuated to lift the rod and contact, and will so operate until the contact is broken. Thereupon the actuator circuit is broken and the other of the motors begins to operate in a reverse direction to lower the contact until it again engages the liquid surface. Thus there is a continual and very slight movement of the contact rod to make and break a circuit including the contact and the liquid surface. In Adelson's preferred form he utilizes a float carried by the liquid surface so that contact is not made directly between the contact rod and the liquid surface, as he found that the float accurately measured variations in the liquid surface of $1/1000$ of an inch while a direct whisker contact with the liquid surface was accurate only to $15/1000$ of an inch.

In some installations the space requirement of the float operated contact renders this form undesirable because the float must be of some size in order to carry the necessary contact structure and therefore requires a basin of some size in which to operate. Obviously the larger the basin the more liquid is required in order to raise the liquid surface, which, in some installations, means that the Adelson meter will be slow in responding to the changes in the liquid level to be measured. On the other hand, a whisker dipping directly into the liquid surface is objectionable because with that type of contact there is a constant and considerable fluctuation of the contact rod which involves considerable wear on the part of the meter and also renders it somewhat inaccurate.

The primary object of my invention is to provide a contact for a contact gauge, of which the Adelson meter is one example, which eliminates reciprocation of the contact positioning mechanism and thereby provides a more accurate reading while involving less movement of the motors and the connecting mechanism. It will be obvious from the description that follows that the contactor of my invention can be used in any gauge, or meter, operative to indicate the position, or change of position, of any surface. Such a gauge can be used to indicate the position of a movable solid surface, the gauge operating by movement of a contactor which alternately engages and disengages the surface to be measured.

Another important object of my invention is to provide a contact member for use in a liquid level gauge, such as the Adelson type, which is as accurate as the float contact preferred by Adelson, but which does not involve a float and its consequent relatively large basin, and which practically eliminates the constant reciprocation of a whisker type contact.

These and other objects will be apparent from the description and claims which follow.

The error in the whisker type of contact, and the relatively large magnitude of reciprocation involved with that type of contact, is probably due to the formation of a meniscus around the whisker when the whisker enters the liquid surface and as it leaves it. It is well known that a very noticeable concave meniscus is formed as a whisker enters the liquid surface, due to the surface tension of the liquid opposing free penetration of the liquid by the whisker, and that a convex meniscus is formed around the whisker, and especially as it is withdrawn from the liquid, due to the attraction of the liquid for the whisker. The vertical distance between the two extremes is considerable and involves consequent error in operation of the Adelson meter with a whisker type contact, and also involves constant reciprocation of considerable magnitude of the contact rod.

My invention will be readily understood from consideration of the following detailed description and of the drawings which form a part thereof and in which.

Figure 6:
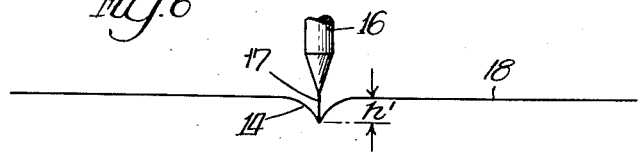
Figure 6 illustrates the concave meniscus customarily formed as a whisker type contact is engaging the liquid surface.
Figure 7:
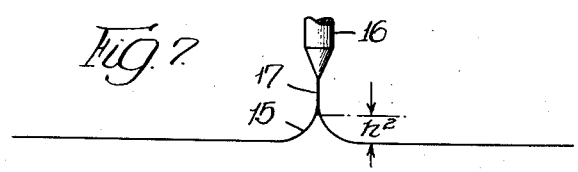
Figure 7 shows the convex meniscus formed around the whisker as the whisker is being withdrawn from the liquid.

The advantages of my invention will be more readily understood if we first consider the disadvantages of the whisker type contact member, and the accompanying meniscus, which are illustrated in Figures 6 and 7. As above indicated a contact rod 16 is raised and lowered with respect to liquid surface by means of a gear cage between two opposed unidirectional motors which are alternately actuated as an actuator circuit through the contact rod 16 and the liquid is made or broken. Such details of the meter device itself are not a part of my invention and are described in the copending application of Adelson, above mentioned. Let us assume that the lower end of the contact rod is provided with a fine wire, or whisker, 17 to make the contact with the liquid surface 18. As the rod 16 is lowered the tension of the surface of the liquid film 18 opposes penetration by the whisker 17, thereby forming a concave meniscus 14 of a depth $h^1$. In many instances the tip of the whisker 17 may become corroded so as to interfere with a proper closing of the actuator circuit when the end of the whisker first touches the liquid surface and before the whisker itself actually is wetted. Upon the closing of the actuator circuit through the contact rod 16, the whisker 17 and the liquid 18, the flow of power to the first motor is stopped and that to the second motor begun, thereby raising the contact rod 16. However, as the whisker 17 is withdrawn from the liquid it forms a convex meniscus 15 of a height $h^2$ as shown. Obviously the actuator circuit will not be broken until the convex meniscus 15 is broken, which corresponds to travel of the probing rod 16 equal to $h^2$. Thus the actuator circuit may be closed improperly for as long as it takes the whisker 17 to rise the vertical distance $h^1+h^2$. In such a condition it will require a corresponding length of time of downward travel of the probing rod 16 before the whisker will again close the actuating circuit. In such cases the error is due to the necessity of the contact traveling the distance $h^1+h^2$ in order to break and make the contact. However, even if the actuating circuit is closed as soon as the whisker touches the liquid surface, there still remains the inaccuracy due to the convex meniscus (equivalent to $h^2$). In meters of this type it is desired that the motion of the contact rod, or probe, 16 be rather slow, in fact to be at the lowest figure possible, having consideration for the maximum rate of level change and the necessity of having an immediate response thereto. It is therefore obvious that there will be a constant and considerable fluctuation, or hunting, of the probe 16 when the usual type contact is used.

I have found that if instead of the simple whisker type contact heretofore used, which is moved vertically to and from the liquid surface by the actuator of the level sensing mechanism, an independently power driven movable contact member is provided which travels fast enough to avoid formation of a meniscus and which makes and breaks contacts at high frequency, the meter not only is more accurate but that for all practical purposes the probing rod 16 is stationary so long as the liquid level remains unchanged. Such movable contact members slice or cut the surface film at a velocity which avoids the formation of a meniscus, either concave or convex, and also provide a system whereby the time between contacts is radically reduced, and the level sensing mechanism will receive contradictory signals at a high frequency so as to avoid overtravel and the consequent errors resulting therefrom. This will be obvious from a consideration of the forms of contacts shown in the drawings.

Figure 1:
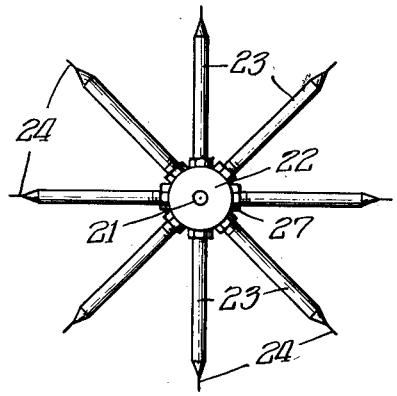
Figure 1 is a view of a preferred form of contact member.
Figure 2:
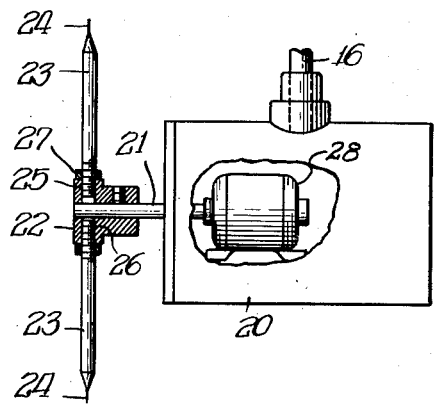
Figure 2 is a side view of the contact member of Figure 1 and the associated driving member.

A preferred form is shown in Figures 1 and 2 and comprises a small motor 28 and gear reducer, not shown, mounted in a preferably water-tight cage 20 at the lower end of the contact rod 16. Upon the shaft 21 driven by the motor and gear reducer is mounted a small wheel 22. Upon the wheel 22 are mounted a number of arms 23 carrying contact whiskers 24 at their outer ends. The arms 23 are preferably made adjustable with respect to the wheel 22 as by threading the inner ends 25 of the arms 23 into similarly threaded portions 26 of the wheel, and locking them in their proper positions by lock nuts 27.

The small drive motor for rotating the contact member is constantly connected to a source of power so that it operates continuously. I have found that a very suitable rate of rotation of the contact member having eight arms, as shown in Figures 1 and 2, is about 100 revolutions per minute when the arms are 1½ inches long. At this rate there obviously will be 800 contacts per minute or a little more than 13 per second. Such contacts not only follow each other in rapid order but each contact is quickly made and immediately broken by the travel of the whisker. The making and breaking of the actuator circuit at this rapid rate keeps the two motors "a quiver" or "alert," but does not give either a chance to actually respond (except when the liquid level itself is changing). Thus, with the contact member of my invention the contact rod 16 is stationary so long as the liquid level is station. This provides for more accurate measurement with less wear and lower power requirement of the response mechanism than heretofore. The number and radial length of the arms, and their angular velocity can be varied as desired. However any variation in one factor should be compensated for by a modification of one or both of the others in order to keep fairly constant the relation between length of "contact" and length of "no contact."

Figure 3:
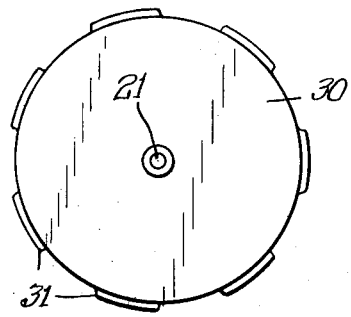
Figure 3 shows another embodiment of a contact member of my invention.

A second form of contact member is shown in Figure 3 and comprises simply a solid wheel 30 mounted on the shaft 21. The peripheral edge of the wheel is provided with a plurality of knife edged projections 31, which may be as small as 1/16 or 1/8 of an inch in height. As the wheel revolves the knife edges of the projections 31 cut the liquid surface, thereby closing the actuator circuit. This form is of value when it is desired to form a contact for a short period of time. Also, in case of a sudden surge upward of the liquid level the solid part of the disc will form a continuous contact with the liquid and thus give a continuous "retract" signal to the response mechanism until equilibrium is again established. It is obvious that the whisker type shown in Figure 1 will form a momentary contact with the liquid only, while the projections 31 of Figure 3, relatively speaking, a prolonged contact with a short break between successive contacts.

Figure 4:
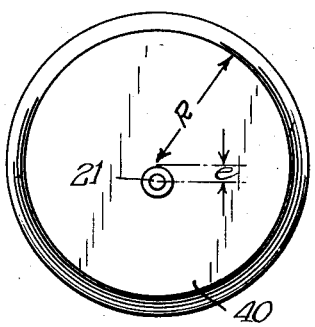
Figure 4 shows another form of contact member.
Figure 5:
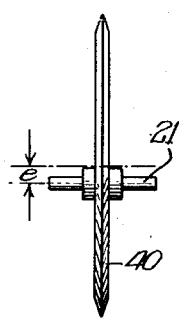
Figure 5 is a side view of the form shown in Figure 4.

Figures 4 and 5 show a front and side view, respectively, of another form of contact member, which has certain advantages. In this embodiment the contact member 40 comprises a knife edged wheel of a radius R. The wheel is mounted upon a shaft 21, the mounting being eccentric to the center of the wheel by some predetermined distance $e$. If the eccentric wheel is not rotating, then it will contact and disengage the liquid surface the same as the whisker of Figures 6 and 7. In such an event, the frequency of contact would be the same as that of a simple contact member, or whisker. However, upon rotation of the wheel 40 the eccentricity thereof causes a variation in level of the wheel periphery (assuming the elevation of the shaft 21 remains constant) equal to $2e$. Functionally, the wheel 40 operates as a wheel with a radius $R-e$, with a single projection of a height of $2e$. Therefore rotation of the eccentric wheel gives an effect similar to that of the other two embodiments shown, in effect acting as a wheel with one arm or contact. It will be obvious that the frequency of contact will be directly proportional to the speed of rotation of the wheel. This form has the advantage of being the cheapest to construct, and it works better with only a slight reduction of motor speed (saving expense in the speed reducer required). The results, frequency and accuracy of contact, are very satisfactory.

It will be obvious that the relative size and shape of the contacts 24 or 31, or the amount of eccentricity $e$ of the wheel 40, can be modified as desired according to the requirements of any particular case. They can provide momentary contact as with a whisker, such as 24, or they can provide somewhat prolonged contact, as with a relatively long projection 31. The number of contacts will depend on the rate of rotation, and the length of the period between contacts will depend on the spacing between contacts. Thus, the length of contact, number of contacts and time between contacts can be proportioned as desired. Such proportioning of the actual contact member, and the number to be mounted upon the wheel, will be obvious to those skilled in the art, having due regard for the requirements for each installation. Obviously many modifications and variations in the invention herein set forth may be made by persons skilled in the art without departing from the spirit and scope hereof. Also it will be obvious that this invention is applicable to a gauge for measuring the relative position or movement of any surface, and therefore its application is not limited to the Adelson liquid level gauge mentioned. It is therefore to be understood that my invention is not limited to use with any particular apparatus or used for any particular purpose, but is to be construed as broadly as defined in the claims.

I claim:

1. A contact member for a liquid level meter of the type described comprising a rotatable shaft mounted for vertical movement with respect to the liquid surface to be measured, a revolvable member carried at the end of said shaft, a contact mounted on said revolvable member, means for continuously revolving said shaft and said member, said contact alternately engaging and disengaging the liquid surface upon rotation of said revolvable member, and means operative to raise and lower said shaft in response to variations of said liquid surface to maintain a constant distance between said liquid surface and said shaft.

2. In a liquid level meter of the type described a contact member comprising a wheel mounted for rotation around a horizontal axis, a plurality of arms mounted on said wheel, and a whisker contact mounted at the outer end of each of said arms, means to rotate said wheel continuously around said axis, and means for raising and lowering the axis of said wheel in response to variations in the liquid level to be measured, to keep the distance between said axis and said liquid level substantially constant.

3. Apparatus according to claim 1 wherein said revolvable member comprises a wheel, and a plurality of knife edges mounted on the peripheral edge of said wheel.

4. Apparatus according to claim 1 wherein said revolvable member is a wheel having at least one knife edge mounted on its peripheral edge and said knife edge has a portion with a radial distance from the center of rotation of said wheel greater than that of other portions of the peripheral edge of said wheel.

5. Apparatus according to claim 2 wherein the number of arms on said wheel and the speed of rotation imparted to said wheel are proportioned to result in about thirteen contacts per second.

6. The apparatus of claim 2 wherein the means for rotating said contact member operates to move the contact member through a vertical range greater than that of the required accuracy of position measurement.

7. In an apparatus for measuring the position of a surface by moving a contact means toward and away from the surface the position of which is to be measured, the contacting of said surface with said contact means causing the contact means to move away from said surface and the breaking of said contact between said surface and said contact means causing the contact means to move toward said surface, a contact means comprising a horizontal rotatable shaft, a plurality of spaced contact points affixed to said shaft and rotatable in a vertical plane upon rotation of said shaft, supporting means for said shaft operative in response to variations in the position of the surface to be measured to raise and lower said shaft to keep the distance between said surface and said shaft substantially constant, and means for continuously rotating said shaft independently of any movement of said supporting means at a velocity sufficient to make and break contact with said surface at high frequency.

8. In an apparatus for measuring the level of a movable surface, a rotatable member, means for rotating said member around a horizontal axis, means responsive to variations in the surface level to be measured and operate to raise and lower said rotatable member in response to such variations to maintain the distance of its axis of rotation from the level of said movable surface substantially constant, and a contact carried at the periphery of said member.

9. Apparatus according to claim 8 wherein said rotatable member comprises a contact wheel eccentrically mounted on said horizontal axis.

10. Apparatus according to claim 8 wherein said rotatable member carries at its periphery a plurality of contacts.

11. In an apparatus for measuring the level of a liquid surface which includes a probing rod adapted to be moved to and from the surface the level of which is to be measured, the contacting of said surface with said probing rod causing the rod to be withdrawn from said surface and thereby to break the contact between the two and the breaking of the contact between said surface and said rod causing said rod to be moved toward said surface, a contact member connected to said rod, said member being mounted on said rod for rotation in a vertical plane, said rotation being independent of, and in addition to, any motion imparted to said contact member by said rod, and means for continuously rotating said contact member at a velocity sufficient to make and break contact at high frequency.

12. A surface position gauge including a shaft, a motor in driving connection with said shaft and operative to impart continuous motion to said shaft, a contact member mounted at the end of said shaft, said member making and breaking contact with said surface upon movement of said shaft by said motor, and means operative upon a change in the elevation of said surface to move said contact member vertically into position to make and break contact with said surface at the new elevation.

SVERRE KONGELBECK.

REFERENCES CITED

The following references are of record in the file of this patent:

UNITED STATES PATENTS

| Number | Name | Date |
|---|---|---|
| 468,120 | Thomson | Feb. 2, 1892 |
| 663,695 | Davidson | Dec. 11, 1900 |
| 724,704 | Hutton | Apr. 7, 1903 |
| 2,032,016 | Hitner | Feb. 25, 1936 |
| 2,059,152 | Smith | Oct. 27, 1936 |

FOREIGN PATENTS

| Number | Country | Date |
|---|---|---|
| 20,670 | Great Britain | 1907 |